United States Patent
Swarvar et al.

(10) Patent No.: US 6,335,048 B1
(45) Date of Patent: Jan. 1, 2002

(54) INTERCONVERTIBLE SOLID AND LIQUID STATES OF OLESTRA

(75) Inventors: Larry C. Swarvar; John G. Fulcher, both of Dallas; Monoj K. Gupta, Richardson, all of TX (US)

(73) Assignee: Recot, Inc., Pleasanton, CA (US)

( * ) Notice: Subject to any disclaimer, the term of this patent is extended or adjusted under 35 U.S.C. 154(b) by 0 days.

(21) Appl. No.: 09/622,575

(22) PCT Filed: Feb. 19, 1999

(86) PCT No.: PCT/US99/03701

§ 371 Date: Aug. 18, 2000

§ 102(e) Date: Aug. 18, 2000

(87) PCT Pub. No.: WO99/41992

PCT Pub. Date: Aug. 26, 1999

Related U.S. Application Data

(60) Provisional application No. 60/075,436, filed on Feb. 20, 1998.

(51) Int. Cl.[7] ............................................. A23D 9/007
(52) U.S. Cl. ....................... 426/611; 426/804; 536/119; 554/168
(58) Field of Search ........................ 426/611; 536/119; 554/168

(56) References Cited

U.S. PATENT DOCUMENTS

| | | | |
|---|---|---|---|
| 2,521,242 A | 9/1950 | Mitchell, Jr. | |
| 2,846,312 A | 8/1958 | Lantz et al. | |
| 2,999,022 A | 9/1961 | Payne et al. | |
| 3,455,699 A | 7/1969 | Bell et al. | |
| 3,528,823 A | 9/1970 | Rossen | |
| 3,892,880 A | 7/1975 | Grolitsch | |
| 4,087,565 A | 5/1978 | Ebskamp | |
| 4,217,372 A | 8/1980 | Ebskamp | |
| 4,335,157 A | 6/1982 | Varvil | |
| 4,568,556 A | 2/1986 | McCoy | |
| 4,797,300 A | 1/1989 | Jandacek et al. | |
| 4,889,740 A | 12/1989 | Price | |
| 5,017,398 A | 5/1991 | Jandacek et al. | |
| 5,085,884 A | 2/1992 | Young et al. | |
| 5,102,683 A | 4/1992 | Letton et al. | |
| 5,158,796 A | * 10/1992 | Bernhardt | 426/549 |
| 5,158,798 A | 10/1992 | Fung et al. | |
| 5,230,919 A | * 7/1993 | Walling | 426/633 |
| 5,306,515 A | 4/1994 | Letton et al. | |
| 5,419,925 A | * 5/1995 | Seiden | 426/611 |
| 5,422,131 A | 6/1995 | Elsen et al. | |
| 5,436,021 A | 7/1995 | Bodor et al. | |
| 5,587,196 A | 12/1996 | Mehnert et al. | |
| 6,261,628 B1 | * 7/2001 | Howre | 426/611 |
| 2001/0003119 | * 6/2001 | Bernhardt | |

FOREIGN PATENT DOCUMENTS

| | | | |
|---|---|---|---|
| WO | WO 93/00823 | * | 1/1993 |
| WO | WO 94/09638 | * | 5/1994 |
| WO | WO 94/09641 | * | 5/1994 |
| WO | WO 98/47909 | | 10/1998 |
| WO | WO 98/52429 | | 11/1998 |

* cited by examiner

Primary Examiner—Carolyn Paden
(74) Attorney, Agent, or Firm—Rothwell, Figg, Ernst & Manbeck

(57) ABSTRACT

Olestra, a low-calorie natural fat and oil substitute, that is normally a viscous semi-solid at ambient temperatures is rendered substantially permanently liquid and pumpable by application of shear mixing from the semi-solid state, slow cooling from the melted state, or shear mixing and slow cooling from the melted state. Slow cooling inhibits the formation of the crystalline network that is characteristic of the viscous semi-solid form, and shear mixing further inhibits such formation. Olestra processed according to the invention advantageously returns to the semi-solid form after use in snack food manufacturing, thus providing the desired passive oil loss control. The invention greatly improves the practical handling of Olestra in fried food manufacturing processes.

20 Claims, No Drawings

INTERCONVERTIBLE SOLID AND LIQUID STATES OF OLESTRA

This appln is a 371 of PCT/US99/03701 filed Feb. 19, 1999 which claims benefit of Prov. No. 60/075,436 filed Feb. 20, 1998.

BACKGROUND OF THE INVENTION

1. Technical Field

This invention relates to improvements to non-digestible cooking oils. More specifically, this invention relates to a process for producing an improved form of Olestra that remains in a liquid and flowable state after storage for prolonged periods at room temperatures, yet advantageously re-solidifies after melting and cooling to return to a semi-solid form that is desired to control passive oil loss.

2. Description of the Background Art

Non-caloric or reduced calorie fat and oil substitutes offer many advantages to consumers who desire to reduce their caloric intake. Many consumers desire to have a lower-calorie diet without forgoing the consumption of, for example, fried snack foods such as potato chips, tortilla chips and the like. One such substitute, Olestra, has recently been approved for limited marketing and use (for the preparation of savory snack foods) by the United States Food and Drug Administration (FDA).

"Olestra" refers to a substantially non-caloric fat and oil substitute that is a mixture of octa-, hepta- and hexa-esters of sucrose with fatty acids derived from edible fats and oils or from fatty acid sources that are generally recognized as safe (GRAS). Olestra is described in 21 C.F.R. §172.867, which is incorporated herein by reference.

Olestra is manufactured by the Procter & Gamble Company and marketed under the OLEAN trademark. Numerous U.S. patents assigned to Procter & Gamble describe the manufacture and many uses of Olestra, and those skilled in this area of food science are familiar with methods for preparing Olestra. For example, Olestra can be prepared by trans-esterifying sucrose with seven or eight fatty acids obtained from cottonseed or soybean oil. Olestra is non-caloric because the digestive enzymes found in humans cannot cleave the polymer into smaller molecules that can be used by the body. See, for example, U.S. Pat. No. 3,600,186 ("Low Calorie Fat-Containing Food Composition"); U.S. Pat. No. 4,005,196 ("Vitaminized Compositions for Treating Hypercholesterolemia"); U.S. Pat. No. 4,797,300 ("Compositions Containing Novel Solid, Non-Digestible, Fat-Like Compounds"); U.S. Pat. No. 5,442,131 ("Non-Digestible Solid Particles For Passive Oil Loss Control"); U.S. Pat. No. 5,480,667 ("Non-Digestible Fat Compositions Containing Diversely Esterified Polyol Polyester For Passive Oil Loss Control"); U.S. Pat. No. 5,490,995 ("Solid Non-Digestible Polyol Polyesters Containing Esterified Hydroxy Fatty Acids Such as Esterified Ricinoleic Acid"); U.S. Pat. No. 5,085,884 ("Reduced Calorie Potato Chips and Other Low Moisture Fat-Containing Foods Having Less Waxiness and Improved Flavor Display"); and U.S. Pat. No. 5,236,733 ("Low Moisture Fat-Containing Foods Such as Potato Chips having Less Waxiness and Improved Flavor Display"), each of which is incorporated herein by reference. Other patents disclosing processes for synthesizing polyol polyesters include U.S. Pat. Nos. 4,517,360 and 4,518,772 to Procter & Gamble, each of which is incorporated herein by reference. Olestra has been found to be particularly useful for the preparation of reduced calorie fried snack foods such as potato chips and tortilla chips.

Reduced calorie potato chips and tortilla chips can be prepared by frying potato slices or masa pieces, respectively, in Olestra, at temperatures generally between about 350 and 400° F. Advantageously, Olestra can be substituted for the commonly-used natural fats and oils (typically cottonseed oil, peanut oil, soybean oil, etc.) within the preexisting fryer equipment and with minimal variation to the overall cooking process. Potato chips and tortilla chips that have been cooked (fried) in Olestra rather than natural fats and oils provide flavor and textural characteristics that are well-accepted by consumers, while providing far fewer calories.

The regular ingestion of certain forms of polyol polyesters is known to produce undesirable passive oil loss. The control of passive oil loss is a requirement of any commercially-viable Olestra. As described in U.S. Pat. No. 5,480,667, for example, certain prior art liquid Olestra compositions failed to control passive oil loss while certain solid Olestra compositions impart an undesirable "waxy" mouthfeel and thus, too, are not commercially acceptable. A mixture of solid and liquid Olestra is provided by the manufacturer for passive oil loss control. This mixture is a semi solid at ambient temperatures, and is not pumpable. Accordingly, one goal of the present invention was to provide a flowable Olestra composition that controls passive oil loss when used in snack food manufacturing processes, yet provides good mouthfeel and other properties favored by consumers.

Olestra has other uses in the manufacture of savory snack foods, such as a substitute for the oil used in flavorful toppings. Additionally, like naturally-occurring oils, Olestra can be sprayed onto baked snack chips (e.g. baked tortilla chips or baked fabricated potato chips) to improve the adhesion of salt and/or other toppings thereto.

Modern commercial-scale snack food manufacturing facilities represent enormous capital investments. Large commercial-scale fryers can contain hundreds of gallons of cooking oil. Typical commercial-scale snack food manufacturing facilities receive cooking oil (which is liquid and thus highly flowable and pumpable at room or typical ambient temperatures) in railway car-sized shipments. These facilities include large storage tanks (capable of storing thousands of gallons of liquid cooking oil) for storing the liquid cooking oil at room or ambient temperature prior to use and, as explained more fully below, during transient "downtimes" in the manufacturing process. Cooking oil is relatively expensive and comprises a major element of the overall cost of producing fried snack foods. The energy costs of heating cooking oil within the fryer further contributes significantly to the manufacturing costs. Thus, cooking oil must be handled properly so as to maintain and prolong its useful life and to reduce manufacturing costs.

Oxidation of cooking oil resulting in the formation of lower molecular weight aldehydes and ketones is the chemical reaction primarily responsible for limiting the useful life of cooking oil. Cooking oil used past its useful life imparts undesirable flavor notes to the foods cooked therein. Unnecessary exposure of cooking oil to high heat or oxygen therefore must be avoided in order to eliminate unnecessary degradation and to lower overall energy costs. Accordingly, after production is completed it is common to remove (pump) the cooking oil from the fryer back to the storage tank. The oil is allowed to cool to near ambient temperatures in the storage tank. The oil subsequently is pumped back to the fryer and reheated in the fryer when the manufacturing process is to re-commence.

One disadvantage and difficulty presented by the substitution of Olestra into the snack food manufacturing process is the fact that Olestra as supplied by Procter & Gamble is a relatively viscous semi-solid at ambient temperatures commonly encountered in manufacturing settings, e.g. temperatures below about 100° F. Olestra typically must be heated to at least about 120° F. to lower its viscosity sufficiently to render it a pumpable semi-solid, and preferably, to about 140° F. to melt it, to allow it to be pumped as a liquid to the storage tanks mentioned above using pumps typical for this application. A self priming pump like a drum pump is not designed for, nor is it practical to unload a large tank or vessel of semi solid Olestra. Additionally, Olestra must be melted slowly to minimize localized heat stress, and it can require many hours to melt the quantity used in a commercial fryer.

In as much as the Olestra returns to the unpumpable, viscous semi-solid state when cooled, practical handling of liquid Olestra within the manufacturing plant would require the railroad tank cars, storage tanks and the system of oil transfer pipes within the facility to be fitted with heaters. In addition to the great expense associated with such a retrofit, storage of Olestra in its melted state (e.g. at greater than 140° F.) reduces its useful life. Olestra is substantially more expensive than vegetable oils, and thus there is a great need to preserve the quality of Olestra by being able to store it at room temperatures.

Accordingly, there is a need for Olestra compositions for use in manufacturing fried food products (particularly potato chips, tortilla chips, corn chips and the like) that remain liquid (i.e., with a viscosity low enough such that it is flowable and pumpable) at room- or ambient-temperature conditions.

Pumpable or "pourable" or "flowable" shortenings, fats and oils, e.g. pourable margarine, are generally known. As described in, for example, U.S. Pat. No. 2,521,242, oleaginous compositions characterized by pumpable fluid consistency over the normal range of room temperature are provided by ensuring the development of predominantly a special crystalline form (beta stable crystals) of the triglycerides. As used herein, "flowable Olestra" refers to Olestra that is processed according to the present invention to change its physical properties while still meeting the requirements of 21 C.F.R. §172.

Certain edible oils, such as fully-hydrogenated soybean oil and corn oil, are known as "beta-crystal forming oils."When beta-crystal forming oils (or blends of oils containing beta-forming hardstock) are processed under certain conditions (blending while molten and then cooling accompanied by mechanical agitation), beta crystals are formed but, because the beta crystals do not aggregate to form a crystalline network, the oil may remain pumpable when stored for prolonged periods at room temperature. Other edible oils, such as fully-hydrogenated cottonseed and palm oils, however, form beta prime crystals which aggregate into a complex crystalline network and cannot be rendered pumpable by such processing. The crystalline structure of Olestra is basically different from the crystalline structure of beta-forming oils. Thus Olestra is not expected to form beta crystals.

U.S. Pat. No. 5,306,515 ("Reduced Calorie Pourable Shortening, Cooking Oils, Salad Oils or Like Compositions") reveals one solution to providing a room temperature pumpable Olestra. This document, too, is incorporated herein by reference. This patent relates to pourable compositions that contain mixtures of various materials including solid polyol fatty acid polyesters, liquid non-digestible oils, digestible oil and hardstock fat. These mixtures contain some amount of beta crystal forming oils and are "pourable" because the mixture melt point is near room temperature or because the mixture was processed by techniques typical for making pourable shortening. Unfortunately these materials contain some digestible oil and are not, to our knowledge, commercially available. These "pourable" compositions are, generally, less viscous than the flowable Olestra produced according to the present invention.

Unlike U.S. Pat. No. 5,306,515 referenced above, the current invention does not require the addition of digestible oil or hardstock fat or processing to form beta crystals. In fact, we have found that application of pourable shortening processing with a continuous scraped surface heat exchanger (as has been used to prepare pourable digestible oil products) does not render commercially available Olestra into a material that remains flowable or pumpable at ambient temperatures for more than a day. Thus there still is a need for converting commercially available Olestra into a pumpable composition at ambient temperatures to prolong Olestra shelf life and at the same time reduce cost and increase ease of handling Olestra.

SUMMARY OF THE INVENTION

In one aspect, the present invention provides a process for imparting a substantially permanently liquid consistency to Olestra which is normally a viscous semi-solid at temperatures between about 60 and 100° F., the process comprising slowly cooling melted Olestra to a temperature below about 100° F., wherein the cooling is performed slowly enough to inhibit crystal network formation within the Olestra. The Olestra processed in this manner remains flowable (i.e., it remains a viscous liquid) for at least two days, and preferably for over a month, upon storage at temperatures between about 60 and about 100° F. Furthermore, melting and cooling the flowable Olestra in the course of snack food manufacture returns the material to the original Olestra morphology necessary for control of passive oil loss.

In another aspect, the present invention provides a process for imparting a substantially permanently liquid consistency to Olestra which is normally a viscous semi-solid at temperatures between about 60 and 100° F., the process comprising subjecting semi-solid Olestra to repeated cycles of melting and slow cooling. These repeated cycles reduce crystal aggregation in the Olestra. The Olestra processed in this manner after at least three cycles remains flowable for at least two days, and preferably for over a month or more, upon storage at temperatures between about 60 and about 100° F. Furthermore, melting and cooling the flowable Olestra in the course of snack food manufacture returns the material to the original Olestra morphology necessary for control of passive oil loss.

In another aspect, the present invention provides a process for imparting a substantially permanently liquid consistency to Olestra which is normally a viscous semi-solid at temperatures between about 60 and 100° F., the process comprising shearing the semi-solid Olestra while maintaining the Olestra at a temperature below about 120° F., wherein the shearing process imparts sufficient shear to the Olestra so as to disrupt its crystalline structure but does not cause local heating of the Olestra to a temperature above about 120° F. Preferably the shearing is carried out for at least about twenty hours, more preferably for about 20 to about 120 hours. The Olestra processed in this manner remains flowable for at least two days upon storage, and preferably for over a month or more, at temperatures between about 60 and 100° F. Again, melting and cooling the flowable Olestra in the course of snack food manufacture returns the material to the original Olestra morphology necessary for control of passive oil loss.

In yet another aspect, the present invention provides a process for imparting a substantially permanently-liquid consistency to Olestra which is normally a viscous semi-solid at temperatures between about 60 and 100° F., the process comprising shearing melted Olestra while cooling from above 140° F. to below 120° F., wherein the shearing process imparts sufficient shear to the Olestra so as to disrupt crystal aggregates but does not cause local heating of the Olestra to a temperature above about 120° F. Preferably the shearing is carried out for at least about 20 hours, more preferably for about 20 to about 120 hours. The Olestra processed in this manner remains flowable for at least two days upon storage, and preferably for over a month or more, at temperatures between about 60 and 100° F. Again, melting and cooling the flowable Olestra in the course of snack food manufacture returns the material to the original Olestra morphology necessary for control of passive oil loss.

The present invention also relates to improvements to processes for manufacturing low-calorie fried foods, such as low-calorie potato chips, tortilla chips, corn chips and the like. The invention is useful to produce a flowable Olestra at the manufacturing site or at the site of use (for example, the site of snack food production). The snack food processor may utilize the invention to convert either newly received Olestra or Olestra removed from a fryer into a flowable Olestra, thus permitting the Olestra to be stored at temperatures less than about 120° F. and thus extending oil life and easing handling. In a typical process wherein a cooking oil is supplied to a fryer, circulated through the fryer during a food cooking process, and periodically removed from the fryer and stored in a storage tank, the invention provides an improvement wherein the cooking oil is Olestra which is normally a viscous semi-solid at temperatures between about 60 and about 100° F., and wherein the Olestra which is periodically removed from the fryer at temperatures above about 140° F. is slowly cooled so as to inhibit the formation of a crystalline network and thereby render the Olestra substantially permanently flowable and pumpable when stored at room temperatures. In a preferred aspect, the Olestra is sheared as it is cooled, so as to inhibit the formation of crystal aggregates and hence re-solidification of the Olestra. Olestra processed according to this invention has extended storage life at temperatures less than 120° F., yet remains flowable and pumpable.

DETAILED DESCRIPTION OF THE PREFERRED EMBODIMENTS

The present invention solves a long-felt need by providing a composition consisting essentially of Olestra in the form of a flowable, pumpable liquid which (1) is pumpable over the normal range of room temperatures found in snack food manufacturing facilities (e.g. below about 100° F. and particularly between about 60 and 100° F.) and (2) remains in the desired pumpable, liquid state substantially indefinitely when stored within that normal range of room temperatures. This ability to remain in a pumpable, liquid state when stored at room temperature differentiates "flowable Olestra" according to the present invention from the semi-solid Olestra starting material. Advantageously, when the flowable Olestra is melted (e.g., when used for the preparation of fried snack food products) and then normally cooled (e.g., as part of the cooling process undergone by the snack food products), it returns to the original Olestra morphology needed for controlling passive oil loss. Moreover, the Olestra provides good mouthfeel and other properties desired by consumers.

The Olestra starting material is, at temperatures between about 60 and 100° F., a viscous semi-solid material that cannot be pumped using the standard pumps typically installed in commercial snack food manufacturing facilities. At 100° F., such Olestra has Bingham viscosity greater than 9 Poise and Bingham yield stress greater than 60 dyne/cm$^2$ (Casson viscosity is greater than 7 Poise and Casson yield stress is greater than 10 dyne/cm$^2$). The penetration measured at 73° F. is greater than 200 mm/10 and less than 500 mm/10. Centrifugation can not separate this semi-solid Olestra into liquid and solid phases.

After processing according to the present invention, the Olestra is a pumpable liquid with Bingham viscosity less than poise and Bingham yield stress less than 30 dyne/cm$^2$ at 100° F. (Casson viscosity is less than 6 Poise and Casson yield stress is less than 7). Fluidity measured at 73° F. is greater than 1.5 g/30 sec. and less than 2.5 g/30 sec. Centrifugation allows separation of a solid-enriched phase from flowable Olestra.

X-ray analysis of the semi-solid Olestra starting material reveals the presence of some fat crystals, but such crystals are not typical vegetable oil beta or beta-prime crystals. X-ray diffractograms for sheared and unsheared oils (from example 3) show a slight difference in the regions near 50 and 20°θ. The similar diffractograms demonstrate that shear thinning according to the present invention does not alter overall crystal structure or produce beta crystals.

Advantageously, Olestra processed according to the present invention remains in a fluid state when stored at ambient conditions (i.e., between about 60 and about 100° F.) for at least two days after processing and preferably for at least five days, and more preferably substantially permanently, so long as it is stored below about 120° F. For example, Olestra processed according to the present invention has remained in a liquid, pumpable state when stored at 75° F. for one year or more. The phrase "substantially permanently" is used because, to the best of our knowledge and belief, the processed Olestra remains a pumpable liquid indefinitely when stored under ambient temperature conditions.

In accordance with the present invention, it has been discovered that the physical state of Olestra at room temperature can be permanently altered from a viscous semi-solid to provide a material that remains a pumpable liquid when stored at room temperature. Upon heating to a temperature above about 120° F., however, Olestra processed according to the present invention returns to semi-solid form when stored at room temperature (unless it is reprocessed according to this invention). Thus, Olestra which has been processed according to the present invention and is then melted by re-heating to a temperature above about 140° F., and then allowed to cool at rates typically encountered in snack food manufacturing to ambient conditions without shearing, will return in due course to its original viscous, semi-solid state, and regain passive oil loss control properties.

In one aspect of the invention, normally-viscous and semi-solid Olestra is melted, and the melted Olestra is slowly cooled without shearing so as to inhibit its crystallization and re-solidification. For example, cooling melted Olestra from 140° F. to a temperature below its solidification point over a period of 20 hours is sufficient to render it a pumpable liquid when stored at room temperatures.

Although Olestra does not form either beta or beta prime crystals that are characteristic of common fats and oils, it can crystallize upon cooling to produce a viscous semi-solid. Slow cooling in accordance with the present invention reduces crystal aggregation to achieve the desired flowable, stable product.

Shearing melted Olestra further inhibits the ability of the Olestra to form crystal aggregates upon cooling. Thus, shearing is an element of preferred processes according to the invention. Preferred processes which include shearing yield a lower final Olestra viscosity and are more predictable than some non-shear processes. Olestra quickly (within 24 hours) reforms a semi-solid if shearing is performed with a continuous scraped surface heat exchanger, as is typical in pourable shortening processing, thus indicating the deficiency of this prior art process. Both shearing and slow-cooling contribute to the desired reduction of crystal aggregation above 120° F., and it has been found that the cooling rate from about 120° F. to room temperature is not critical as the amount of shearing increases.

Either melted or semi-solid Olestra can be sheared into a liquid that is pumpable at room temperature. With semi-solid Olestra, shearing is started when the temperature is below about 100° F., being careful to minimize local heating so as to keep all of the Olestra at a temperature of less than 120° F. If the Olestra has been melted by heating above 140° F., shearing can be applied while cooling the Olestra to a temperature below 120° F. or after the Olestra has cooled below about 120° F.

Olestra may be received from the supplier in a semi-solid form (typically drums) or in a melted form (typically trucks or rail cars). An impeller or other mechanical means can be submerged into the semi-solid Olestra in drums and the semi-solid Olestra is sheared according to the invention. Axial mixing provided by A310-style three blade impellers (Lightin Unit, General Signal Company) is particularly effective in providing shear without overheating the Olestra if the speed (RPM) is optimized. Alternatively, the semi-solid Olestra can be transferred to a tank equipped with impeller(s) by either melting the Olestra and pumping with standard pumps or transferring the semi-solid from drums with a drum pump. Once the tank is filled to insure proper immersion of the impeller(s), shearing can begin according to the invention. For large deliveries (e.g. rail cars), the Olestra can be melted and pumped into a storage tank equipped with shearing impeller(s) or other mechanical devices to impart shear. After proper filling to insure impeller immersion the tank contents can be sheared according to the invention.

The present invention is also useful for processing Olestra that has been used in the fried food manufacturing process and which normally would re-solidify upon cooling. Olestra typically is heated within the fryer vessel to temperatures above 300° F. When Olestra transfers are required, Olestra is then pumped from the fryer vessel to a storage tank or another vessel equipped with impeller(s) or other shearing devices, where it can be maintained in a liquid state in accordance with the present invention.

In accordance with good engineering practices, the tank should be baffled and the impeller should be placed at least one impeller-diameter below the oil surface to prevent vortexing. Vortexing would incorporate air into the Olestra and form a stable, unpumpable foam. See U.S. Pat. No. 4,919,964 ("Shelf Stable, Highly Aerated Reduced Calorie Food Products") incorporated herein by reference. The temperature of the Olestra rises as work is performed during shearing, and the temperature can be monitored via IR calorimetry or other suitable methods. Care should be taken to ensure that "local" temperatures, for example in the vicinity of the impeller, do not exceed about 120° F., which would undesirably promote re-solidification of the material. An inert atmosphere blanket is provided during shearing or slow cooling to minimize contact with oxygen and maintain flowable Olestra usable life.

Depending upon the type of impeller and vessel design, the shearing time needed to impart enough shear to disrupt the crystal aggregation may vary and optimization can be carried out by those skilled in this field.

While not wishing to be bound to any particular theory, it is thought that the viscous, semi-solid nature of Olestra at temperatures between 60 and 100° F. is due to aggregation of non-digestible solid platelet-like particles of thickness 1 micron or less. See U.S. Pat. No. 5,422,131, incorporated herein by reference. The crystal aggregates possess a porous structure capable of entrapping large amounts of liquid Olestra. High shear mixing according to the present invention appears to disrupt the crystal aggregates, releasing entrapped liquid. The resulting thin suspension remains fluid below 120° F. because re-aggregation is slow in the high viscosity liquid Olestra medium. Thus for the current concentration of non-digestible solid particles in commercially available Olestra, both shearing to disrupt the crystal aggregates and relatively low temperature to maintain high viscosity to inhibit re-aggregation are important to providing Olestra that remains a pumpable liquid upon long-term storage. As described in U.S. Pat. No. 5,422,131, undesirable passive oil loss can occur if crystal aggregates are not present to bind the liquid Olestra. Melting the flowable Olestra, produced according to this invention, followed by rapid cooling, allows crystallization and crystal aggregation to occur, entrapping the liquid Olestra phase within crystal aggregates of solid Olestra.

The following Examples illustrate preferred versions of the invention, but should not be construed to limit it. Variations to the process that result in the preparation of an Olestra composition that remains substantially permanently in the liquid form can be made.

ANALYTICAL TEST METHODS

Viscosity and Yield Stress. Viscosity and yield stress were measured on a Carrimed 5050 controlled stress rheometer (TA Instruments, New Castle, Del.). The following run parameters were used:

| | |
|---|---|
| Plate geometry: | 4 cm, 2 degree cone |
| Start Temperature: | 37.8° C. |
| Final Temperature: | 37.8° C. |
| Equilibration Time: | 1 Minute |
| Peak Torque: | 10000 Dyne Cm |
| Shear Stress Mode: | Linear |
| Ascent Time: | 1 Minute |
| Descent Time: | 1 Minute |
| Gap: | 53 Microns |
| Analysis Mode: | Bingham/Casson |

The "up" flow curves were analyzed with the factory-installed software to compute yield stress, viscosity and thixotropic area. Flow curves for Olestra processed according to this invention fit the Bingham model better:

$$\text{Stress} = (\text{Yield Stress}) + (\text{Shear rate}) \times (\text{Viscosity})$$

while flow curves for semi-solid Olestra fit the Casson model better:

$$\text{Stress} = [(\text{Yield Stress})^{1/2} + (\text{Shear Rate})^{1/2} \times (\text{Viscosity})^{1/2}]^2$$

For the same set of data, the Casson model gives lower yield stress and viscosity values than the Bingham model.

After measurement of test Olestra samples at 100° F., the sample was melted at 140° F. and cooled to 100° F. in the rheometer. Viscosity, yield and loop area increased, indicating return to the semi-solid state.

Penetration. AOCS procedure Cc 16–60, "Consistency, Penetrometer Method" was used with modification. Samples were tempered 48 hours and tested at 73° F. in a controlled temperature room. A Precision Universal Penetrometer with a 35 gram aluminum cone (Part numbers 73510 and 73525, Precision Scientific, Bellwood, Ill.) was used for testing. Penetration is reported in units of tenths of millimeters, abbreviated as mm/10. A correction of 75 mm/10 was made to convert the measurement at 73° F. to 70° F.

Fluidity. American Society for Testing and Materials Procedure D 88-81 "Standard Test Method for Saybolt Viscosity," was used with modification. Saybolt viscosity tubes (brass) with Furol orifice (stainless steel) (Part number 4523, Lab-Line Instruments, Melrose Park Ill.) were filled with sample previously equilibrated 48 hours in a 73° F. controlled temperature room. The stopper was removed and the sample was collected in a tared flask for 30 seconds. The weight of sample collected was recorded and reported as g/30 sec.

X-ray Diffraction. Diffractograms were made on the Scintag 2000 automated powder diffractometer at the Arts and Sciences Instrumentation Center, University of Toledo, Toledo, Ohio by Monarch Analytical Laboratories, Inc., Maumee, Ohio. Sheared and unsheared samples of cottonseed Olestra from Example 3 below were tested. Samples were placed in an acrylic sample holder with cavity dimensions of 26×26×2 mm. Experiments were run at 21° C.

EXAMPLE 1

Shearing with Two Heat-cool Cycles

Soybean-sourced OLEAN® (Olestra) was supplied by Procter & Gamble in a 55-gallon drum containing about 400 pounds of Olestra. At 100° F., Olestra had Bingham viscosity 9.133 Poise and Bingham yield 60.29 dyne/cm². The oil was heated to 155° F. with external heater bands and pumped into a second drum (height 34 inches, diameter 22.5 inches). The drum was fitted with four 2×34 inch baffles (90° apart). A LIGHTNIN® mixer (model XJA-33, Lightnin Unit of General Signal, Rochester, N.Y.) with an 11.2 inch diameter 3-blade impeller (Lightnin model A310) was vertically mounted in the drum lid. A 23 inch long shaft positioned the impeller blade 11 inches (about 1 impeller diameter) from the bottom of the drum. The mixer was operated at 225 RPM. Low heat was applied via heater bands with a setting to maintain a temperature of about 100° F. After cooling and shearing overnight, the oil temperature fell to 114° F. The oil was reheated to 160° F., then cooled and sheared 16 hours while the temperature fell to 107° F. The shear-thinned Olestra was pumped to the original drum and stored nine days at 72° F. The viscosity and yield were measured at 100° F. The shear-thinned Olestra had Bingham viscosity 5.01 Poise and Bingham yield 26.57 dyne/cm². A sample of the material has remained fluid for over 20 months at 75° F.

| Original Olestra (Soybean Olestra) (Up Curve, 100° F.) | | |
|---|---:|---:|
| | Bingham | Casson |
| Viscosity (Poise) | 9.13 | 7.82 |
| Yield (Dyne/cm²) | 60.29 | 10.03 |
| Loop Area (Dyne/cm²/sec) | 5,135 | 5,135 |
| Standard Error Of Fit | 39.81 | 33.02 |

| Shear-thinned Olestra (Soybean Olestra) (Up Curve, 100° F.) | | |
|---|---:|---:|
| | Bingham | Casson |
| Viscosity (Poise) | 5.01 | 4.19 |
| Yield (Dyne/cm²) | 26.57 | 5.45 |
| Loop Area (Dyne/cm²/sec) | 1,032 | 1,032 |
| Standard Error Of Fit | 2.43 | 9.79 |

| Sheared Thinned Olestra after Melting and Cooling (Soybean Olestra) (Up Curve, 100° F.) | | |
|---|---:|---:|
| | Bingham | Casson |
| Viscosity (Poise) | 6.85 | 1.37 |
| Yield (Dyne/cm²) | 341.2 | 287.4 |
| Loop Area (Dyne/cm²/sec) | 7,543 | 7,543 |
| Standard Error | 32.91 | 15.07 |

EXAMPLE 2

Shearing with One Heat-cool Cycle

Cottonseed-sourced Olean® (Olestra) was supplied by Procter & Gamble in a 55-gallon drum containing about 400 pounds of Olestra. At 100° F., Olestra had Bingham viscosity 9.561 Poise and Bingham yield 85.91 dyne/cm². The oil was heated to 148° F. with external heater bands and pumped into the baffled drum/mixer described in Example 1. The oil was sheared for 5 days while the temperature fell to 94° F. The viscosity and yield were measured at 100° F. The shear-thinned Olestra had Bingham viscosity 3.262 Poise and Bingham yield 10.89 dyne/cm². A sample of the material has remained flowable for over 20 months at 75 100° F.

| Original Olestra (Cottonseed Olestra) (Up Curve, 100° F.) | | |
|---|---:|---:|
| | Bingham | Casson |
| Viscosity (Poise) | 9.56 | 7.26 |
| Yield (Dyne/cm²) | 85.91 | 23.17 |
| Loop Area (Dyne/cm²/sec) | 5,356 | 5,356 |
| Standard Error | 45.68 | 33.46 |

| Shear-thinned Olestra (Cottonseed Olestra) (Up Curve, 100° F.) | | |
|---|---:|---:|
| | Bingham | Casson |
| Viscosity (Poise) | 3.26 | 3.02 |
| Yield (Dyne/cm²) | 10.89 | 1.03 |

-continued

Shear-thinned Olestra (Cottonseed Olestra) (Up Curve, 100° F.)

|  | Bingham | Casson |
|---|---|---|
| Loop Area (Dyne/cm²/sec) | 1.350 | 1.350 |
| Standard Error | 2.38 | 3.88 |

Shear Thinned Olestra after Melting and Cooling (Cottonseed Olestra) (Up Curve, 100° F.)

|  | Bingham | Casson |
|---|---|---|
| Viscosity (Poise) | 7.1 | 1.59 |
| Yield (Dyne/cm²) | 325.7 | 267.3 |
| Loop Area (Dyne/cm²/sec) | 7.814 | 7.814 |
| Standard Error | 35.96 | 16.54 |

EXAMPLE 3
Shearing without Heat-cool Cycle

Cottonseed-sourced Olean® (Olestra) was supplied by Procter & Gamble in a 55-gallon drum of standard height (34 inches) and diameter (22.5 inches) containing about 400 pounds of Olestra. At 100° F., Olestra had Bingham viscosity 15.45 Poise and Bingham yield 131.7 dyne/cm². A Lightnin mixer vertically mounted in the drum lid was operated at 150 rpm with two A310 impellers positioned 11 and 22 inches from the bottom of the drum. No heat was applied during shearing. A liquid region quickly formed near the rotating shaft and spread radially until the entire drum was liquefied after mixing 4 hours. The shear-thinned Olestra, temperature 72° F., was pumped into the baffled drum described in Example 1. The viscosity and yield were measured at 100° F. The material had Bingham viscosity 4.423 Poise and Bingham yield 60.22 dyne/cm². A sample of this material re-solidified after four weeks storage.

Some Olestra (about 20 pounds) at the bottom of the drum did not liquefy and was scraped into the baffled drum. The drum was heated to 84° F. and mixed for 5 days with 2 impellers operated at 150 rpm. The viscosity and yield were measured at 100° F. The shear-thinned Olestra had Bingham viscosity 3.450 Poise and yield Bingham 31.47 dyne/cm². A sample of this material has remained fluid at 75° F. for over nineteen months.

Original Olestra (Cottonseed) (Up Curve, 100° F.)

|  | Bingham | Casson |
|---|---|---|
| Viscosity (Poise) | 15.45 | 9.26 |
| Yield (Dyne/cm²) | 131.7 | 58.36 |
| Loop Area (Dyne/cm²/sec) | 3,570 | 3,570 |
| Standard Error | 45.48 | 24.61 |

Shear-thinned Olestra (Cottonseed) (Up Curve, 100° F.)

|  | Bingham | Casson |
|---|---|---|
| Viscosity (Poise) | 3.45 | 2.86 |
| Yield (Dyne/cm²) | 31.47 | 6.53 |

Shear-thinned Olestra (Cottonseed) (Up Curve, 100° F.)

|  | Bingham | Casson |
|---|---|---|
| Loop Area (Dyne/cm²/sec) | 1,149 | 1,149 |
| Standard Error | 3.3 | 7.9 |

Shear Thinned Olestra (Cottonseed) After Melting and Cooling (Up Curve, 100° F.)

|  | Bingham | Casson |
|---|---|---|
| Viscosity (Poise) | 35.56 | 10.18 |
| Yield (Dyne/cm²) | 338.9 | 255.6 |
| Loop Area (Dyne/cm²/sec) | 2,194 | 2,194 |
| Standard Error | 73.59 | 53.59 |

X-ray diffractograms were obtained for the Original Olestra and the shear thinned Olestra oils above. Deconvolution of the sheared oil diffractogram into three peaks gives d-spacings of 4.13, 4.70, and 5.21 Angstroms with relative heights 51:18:30. Deconvolution of the unsheared oil diffractogram to three peaks gives d-spacings 4.15, 4.67, and 5.30 Angstroms with relative heights 52:23:25. Beta crystals, if present, would display a strong, short spacing at 4.6 Angstroms.

EXAMPLE 4
Manufacturing Scale Experiment

An axial flow impeller (Lightin A310) was mounted on-center in a baffled stainless steel tank measuring 48 inches in diameter by 54 inches tall with a dish top and cone bottom. The impeller blades were positioned about one blade diameter (17 inches) above the tank bottom. The tank baffles (4) improve mixing and prevent vortexing of the oil, which would cause the formation of an undesirable stable foam. A piston pump (Graco pump package FT-14 no. 965-145 with pump part no. 946649.) was used to transfer 3200 lbs. (8 drums) of Olestra to the shearing tank. The tank was blanketed with nitrogen at 2 inches of water column pressure. The impeller was operated 24 hours at a speed of 200 rpm. The temperature of the Olestra rose to 100° F. The resulting shear-thinned Olestra was pumped into 500-pound totes for shipment to a frying plant. After 14 days the shear-thinned oil was pumped from the totes into a 400 gallon capacity fryer with a Viking gear pump. Tortilla chips fried in this oil tasted as good as chips made from semi-solid Olestra. The Olestra supplier examined the chips by video microscopy to verify that the Olestra had cooled in the correct crystalline form to provide passive oil loss protection.

EXAMPLE 5
Shear Rate Effects

Olestra became flowable under cyclical compression in a back extrusion cup. A sample compressed at higher crosshead speed returned to the semi-solid state. Slower crosshead speed produced flowable Olestra that has remained fluid for over 18 months.

An Instron Universal Testing Machine Model 1122 equipped with Extension Measurement Unit and Back Extrusion Test Device (Instron Corporation, Canton, Mass.) was used. The cup had an inner diameter of 102 mm and a height of 100 mm. The plunger had a diameter of 93 mm and a height of 13 mm. The cup was filled with 182 g. semi-solid Olestra to a depth of 30 mm. The crosshead was lowered to place the plunger just above the Olestra surface and the crosshead was adjusted to cycle 10 mm into the sample. The crosshead was cycled for 12 minutes with crosshead speed 500 mm/min (300 up-down cycles). After a 2 g. sample was taken for analysis and retention, compression was continued for 120 minutes with a crosshead speed of 50 mm/min (600 cycles total).

The sample compressed 12 minutes had (at 100° F.) Bingham viscosity 4.966 Poise and Bingham yield stress 162.4 dyne/cm$^2$ and remained fluid at least 1 week. When examined after 3 weeks the sample had re-solidified. The sample compressed 12 minutes plus 120 minutes had (at 100° F.) Bingham viscosity 5.399 Poise and Bingham yield stress 224.9 dyne/cm2 and has remained fluid over 18 months.

EXAMPLE 6
Repeated Melting and Slow Cooling

A 55-gallon drum of Olestra was melted (160° F.) and one gallon was transferred to a tin-plated oblong can. The can was cooled for three days at ambient conditions (less than 75° F.) and then heated for 1.5 hours at 190° F. to re-melt the Olestra. After cooling for twenty hours at ambient conditions, the can was again heated for 1.5 hours at 190° F. After cooling again for twenty hours at ambient conditions, the sample was inspected. The Olestra was a pourable liquid; a sample easily poured from the can. A Bingham yield stress of 178.1 dyne/cm$^2$ and Bingham viscosity of 23.7 Poise were measured at 37° C. The sample remained fluid for several months.

We claim:

1. A process for imparting a substantially permanently liquid consistency to olestra which is normally a viscous semi-solid at temperatures between about 60 and 100° F., the process comprising slowly cooling melted olestra to a temperature below about 100° F., wherein the cooling is performed slowly enough whereby the olestra remains a viscous liquid for at least two days upon storage at temperatures between about 60 and about 100° F.

2. The process according to claim 1, wherein the viscous liquid olestra has a viscosity (Bingham) of less than about 5 poise.

3. The process according to claim 1, wherein the olestra remains a viscous liquid for at least about one month upon storage at temperatures between about 60 and about 100° F.

4. The process according to claim 1, wherein the cooling is performed slowly enough to inhibit crystal network formation within the olestra.

5. The process according to claim 1 wherein the olestra is blanketed with an inert gas while being sheared.

6. The process according to claim 5 wherein the inert gas is nitrogen.

7. A process for imparting a substantially permanently pumpable, liquid consistency to olestra which is normally a viscous semi-solid at temperatures between about 60 and 120° F., the process comprising shearing olestra, while maintaining the olestra at a temperature below about 120° F., wherein the shearing process imparts sufficient shear to the olestra so as to disrupt its crystalline structure but does not cause local heating of the olestra to a temperature above about 120° F.

8. The process according to claim 7 wherein the olestra is blanketed with an inert gas while being sheared.

9. The process according to claim 8 wherein the inert gas is nitrogen.

10. The process according to claim 7, wherein the shearing is carried out for at least about twenty hours.

11. The process according to claim 7, wherein the shearing is carried out for at about 20 to about 120 hours.

12. A process for imparting a substantially permanently-liquid consistency to olestra which is normally a viscous semi-solid at temperatures between about 60 and 100° F., the process comprising shearing melted olestra while cooling the olestra from a temperature above about 140° F. to a temperature below about 120° F., wherein the shearing does not cause local heating of the Olestra to a temperature above about 120° F.

13. The process according to claim 12, wherein the shearing is carried out for at least about 20 hours.

14. The process according to claim 12, wherein the shearing is carried out for about 20 to about 120 hours.

15. The process according to claim 12 wherein the olestra is blanketed with an inert gas while being sheared.

16. The process according to claim 15 wherein the inert gas is nitrogen.

17. A process for preparing an olestra-containing food product, comprising:

(a) slowly cooling melted olestra to a temperature below about 100° F., wherein the cooling is performed slowly enough whereby the olestra remains a viscous liquid for at least two days upon storage at temperatures between about 60 and about 100° F., (b) heating the viscous liquid olestra to a temperature above about 140° F., (c) preparing an olestra-containing food product by cooking a food product in the olestra of step (b), and (d) allowing the olestra-containing food product to cool to ambient temperature, whereby the olestra in said food product is semi-solid and capable of controlling passive oil loss upon digestion by a human consumer.

18. The process according to claim 17, wherein the food product is a potato chip.

19. The process according to claim 17, wherein the food product is a corn chip.

20. The process according to claim 17, wherein the food product is a tortilla chip.

* * * * *